(12) United States Patent
Jarusiewic

(10) Patent No.: US 12,741,164 B2
(45) Date of Patent: Sep. 22, 2026

(54) HARNESS WITH BRAIDED LEAD

(71) Applicant: Michael Jarusiewic, Beavercreek, OH (US)

(72) Inventor: Michael Jarusiewic, Beavercreek, OH (US)

( * ) Notice: Subject to any disclaimer, the term of this patent is extended or adjusted under 35 U.S.C. 154(b) by 1046 days.

(21) Appl. No.: 17/591,069

(22) Filed: Feb. 2, 2022

(65) Prior Publication Data

US 2022/0241624 A1 Aug. 4, 2022

Related U.S. Application Data

(60) Provisional application No. 63/144,849, filed on Feb. 2, 2021.

(51) Int. Cl.
*A62B 35/00* (2006.01)
*A01K 27/00* (2006.01)
*A62B 1/16* (2006.01)

(52) U.S. Cl.
CPC ........ *A62B 35/0006* (2013.01); *A01K 27/003* (2013.01); *A62B 1/16* (2013.01); *A62B 35/0043* (2013.01)

(58) Field of Classification Search
CPC .................................................... A01K 27/003
See application file for complete search history.

(56) References Cited

U.S. PATENT DOCUMENTS 2,931,629 A * 4/1960 Keller .................. A01M 31/00 452/187
2,956,541 A * 10/1960 Rall ...................... A63B 69/12 434/254
2,996,228 A * 8/1961 Bauman ............. A01M 31/006 119/857
4,121,688 A * 10/1978 Lirakis .............. A62B 35/0037 182/3
4,396,091 A * 8/1983 Anderson ............ A01M 31/02 224/184
4,478,311 A * 10/1984 Anderson ............ A01M 31/02 119/857
4,958,597 A * 9/1990 Mildner .............. A01K 27/003 119/771
6,027,001 A * 2/2000 Levitan ..................... A45F 3/14 280/1.5
9,400,008 B2 * 7/2016 Tuttle ..................... D04B 19/00
10,194,641 B1 * 2/2019 Benabud .............. A01K 27/006
11,384,699 B2 * 7/2022 Sixel .................. F02D 41/0027
(Continued)

*Primary Examiner* — Marcus Menezes

(74) *Attorney, Agent, or Firm* — Ryan Kromholz & Manion, S.C.

(57) ABSTRACT

According to aspects of the present disclosure, a harness comprises two limb loops created from a harness knot coupled to a lead via the two limb loops of the harness knot at a first end of the lead. The lead is a braided lead, and a single-bowline knot creates a single-bowline loop at a second end of the lead. Further, a removable fastener prevents the braided lead from unbraiding and is removably coupled to the lead in a final loop of the braided lead and removably coupled to the two limb loops of the harness knot. Moreover, the limb loops, lead, and single-bowline loop are made from an integral piece of rope. The braided lead does not unravel while the removable fastener is in place. However, when the removable fastener is removed, the braided lead may unravel to create a rescue rope with a harness.

10 Claims, 3 Drawing Sheets

(56) References Cited

U.S. PATENT DOCUMENTS

| | | | | |
|---|---|---|---|---|
| 2002/0117353 | A1* | 8/2002 | Jones | A62B 35/005 182/3 |
| 2016/0165849 | A1* | 6/2016 | Lewis | A01K 27/003 119/770 |
| 2017/0360009 | A1* | 12/2017 | Anderson | A45F 3/02 |

* cited by examiner

HARNESS WITH BRAIDED LEAD

CROSS REFERENCE TO RELATED APPLICATIONS

This application claims the benefit of U.S. Provisional Patent Application Ser. No. 63/144,849, filed Feb. 2, 2021, entitled HARNESS WITH BRAIDED LEAD, the disclosure of which is hereby incorporated herein by reference.

BACKGROUND

Various aspects of the present invention relate generally to a harness for pulling a sled, and more particularly to a harness with a braided lead that can be used as a safety device.

When going ice fishing, a fisherman loads equipment (e.g., portable shelter, gear, lights, etc.) onto a sled to transport the equipment to a fishing site. To pull the sled, the fisherman may tie a rope to the sled.

BRIEF SUMMARY

According to aspects of the present disclosure, a harness comprises two limb loops created from a harness knot coupled to a lead via the two limb loops of the harness knot at a first end of the lead. The lead is a braided lead, and a single-bowline knot creates a single-bowline loop at a second end of the lead. Further, a removable fastener prevents the braided lead from unbraiding and is removably coupled to the lead in a final loop of the braided lead and removably coupled to the two limb loops of the harness knot. Moreover, the limb loops, lead, and single-bowline loop are made from an integral piece of rope. The braided lead does not unravel while the removable fastener is in place. However, when the removable fastener is removed, the braided lead may unravel to create a rescue rope with a harness.

DETAILED DESCRIPTION

According to various aspects of the present disclosure, a harness with a braided lead includes two limb loops made from a harness knot at a first end. Further, the harness with a braided lead includes a single-bowline knot creating a single-bowline loop at a second end. Thus, the braided lead is between the harness knot and the single bowline knot. Moreover, the limb loops, braided lead, and single-bowline loop are all created from a single piece of rope.

Figure 1:
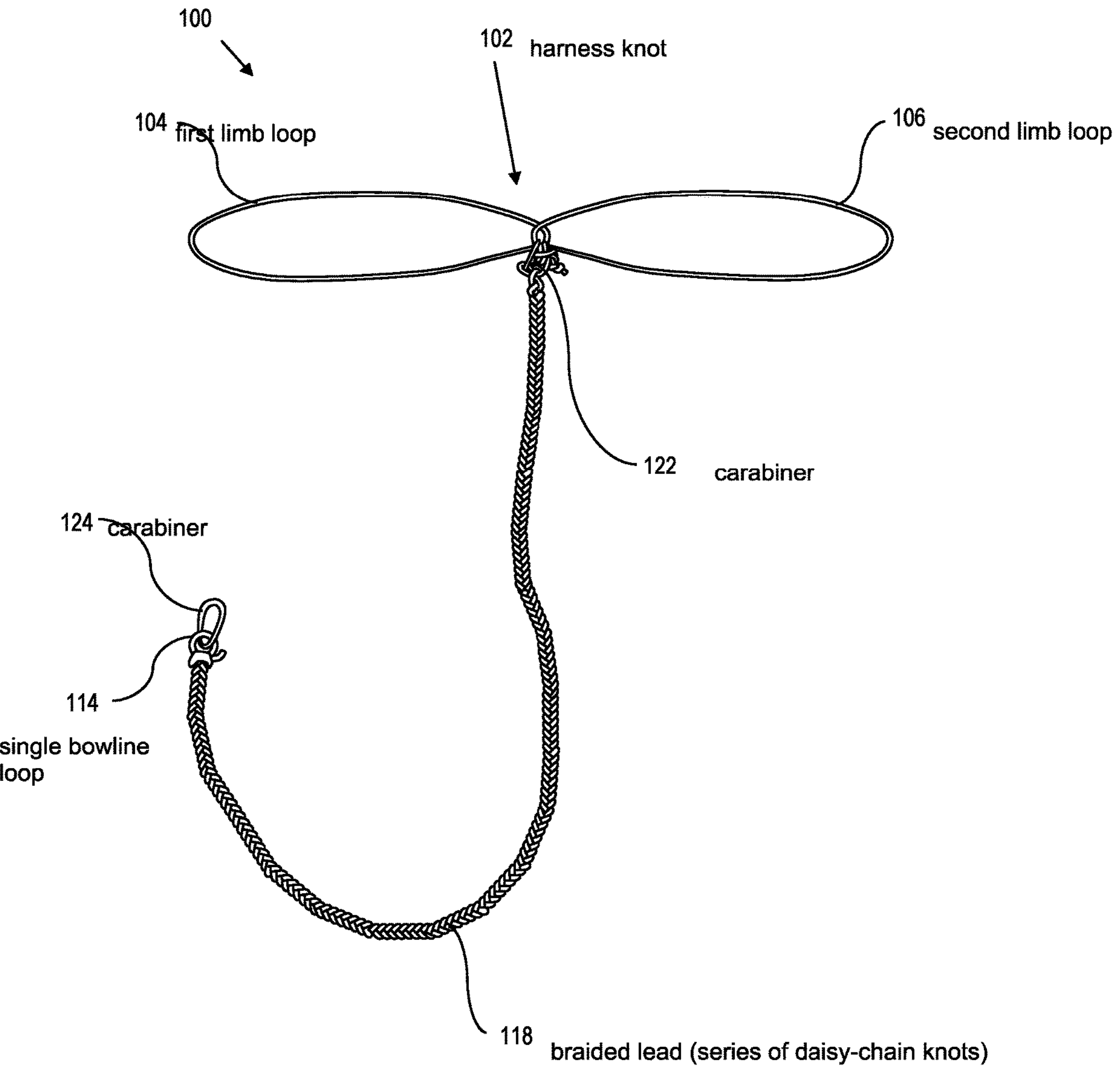
FIG. 1 is a drawing of a first embodiment of a harness with a single-ended braided lead for pulling a sled, according to various aspects of the present disclosure.

Turning now to FIG. 1, a first embodiment of the harness 100 made from a single piece of rope is shown. While any length of rope and thickness of rope may be used, preferred embodiments of the harness 100 (and 200, FIG. 2) use fifty feet (approx. 15.25 meters) of rope with a thickness of ⅜ inch (approx. 1 centimeter). Again, the rope may be made from any suitable material (e.g., synthetic (polypropylene, polyester, etc., combinations thereof), natural, organic, etc., combinations thereof), but preferred embodiments are made from polypropylene rope. A first end of the rope is tied in a harness knot 102 having two large loops (e.g., a double-bowline knot, a Spanish-bowline knot, a parallel-bowline knot (as described herein), etc.): a first limb loop 104 and a second limb loop 106. The limb loops 104, 106 may be any length that is suitable for a user to place his or her arms through. In preferred embodiments, each limb loop 104, 106 is approximately four feet (1.2 meters). The harness knot 102 is held in place with a stopper knot.

At a second end, the harness includes a single-bowline knot that is inverted creating a single-bowline loop 114. The single-bowline loop 114 can be any length, but in the embodiment of FIG. 1, the single-bowline loop 114 is about three inches (7.6 centimeters) in length. With about 50 feet of rope, the length of rope between the single-bowline knot and the harness knot 102 is about 41 feet (12.5 meters). That length of rope is braided (i.e., tied) in a series of daisy-chain knots (i.e., a chain sinnet) beginning at the single-bowline knot to create a braided lead 118.

A tag end of the single-bowline knot is held in place by a first daisy-chain knot which holds the single-bowline knot permanently in place. The daisy chaining repeats, which forms the braided lead 118, where the length of the braided lead is approximately 20% of the length of rope between the harness knot 102 and the single-bowline knot. For example, in the embodiment of FIG. 1, the 41 feet (12.5 meters) of rope condenses down to approximately eight feet (2.4 meters) of braided lead 118. A final daisy-chain knot is held in place by a removable fastener 122 (e.g., a carabiner) that hooks from the final daisy-chain knot loop to the limb loops 104, 106 of the harness knot 102.

A second removable fastener 124 (e.g., carabiner) is added to the single-bowline loop 114 to allow attachment to a load (e.g., sled). In some embodiments, the single-bowline loop 114 couples to the load without a need for the second removable fastener 124.

Figure 2:
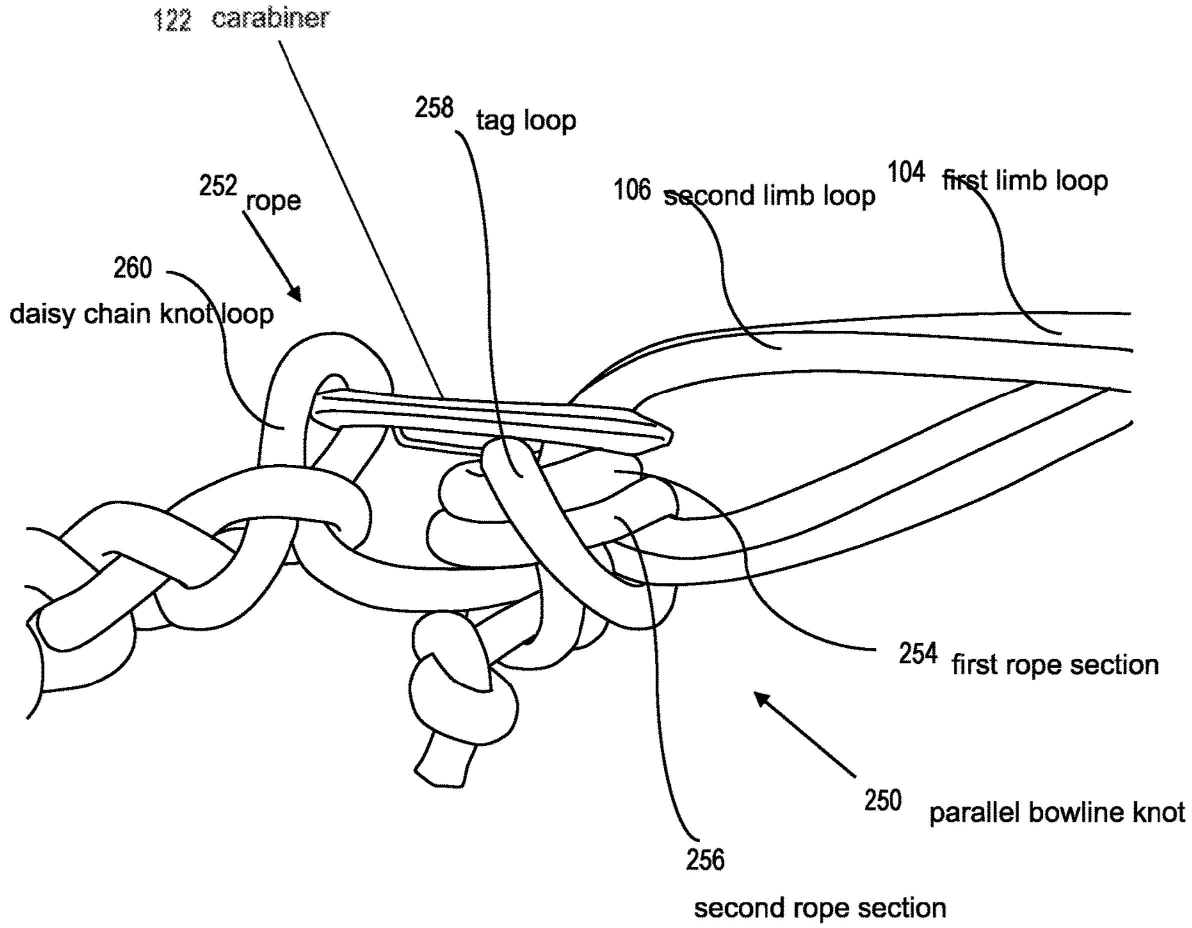
FIG. 2 is a drawing of a parallel-bowline knot, according to various aspects of the present disclosure.

FIG. 2 illustrates a parallel-bowline knot 250 that may be used as the harness knot (102, FIG. 1), as described herein. To make the parallel-bowline knot 250 from a rope 252, a user doubles over the rope such that two sections 254, 256 of the rope 252 in the user's hand run parallel to each other. Then, the user ties a bowline knot with this configuration, which results in two large loops (see 104, 106 FIG. 1) and a smaller "tag loop" 258. The tag loop 258 can be ignored/minimized, or the tag loop 258 can be wrapped around the knot 250 to help secure the knot 250 and prevent the knot 250 from coming untied or slipping under extreme loads.

Further, as shown in FIG. 2 a fastener (122, FIG. 1—e.g., a carabiner as shown in FIG. 2) clips between a final daisy-chain knot loop 260 and the two loops of the parallel-bowline knot 250 (as discussed above).

Figure 3:
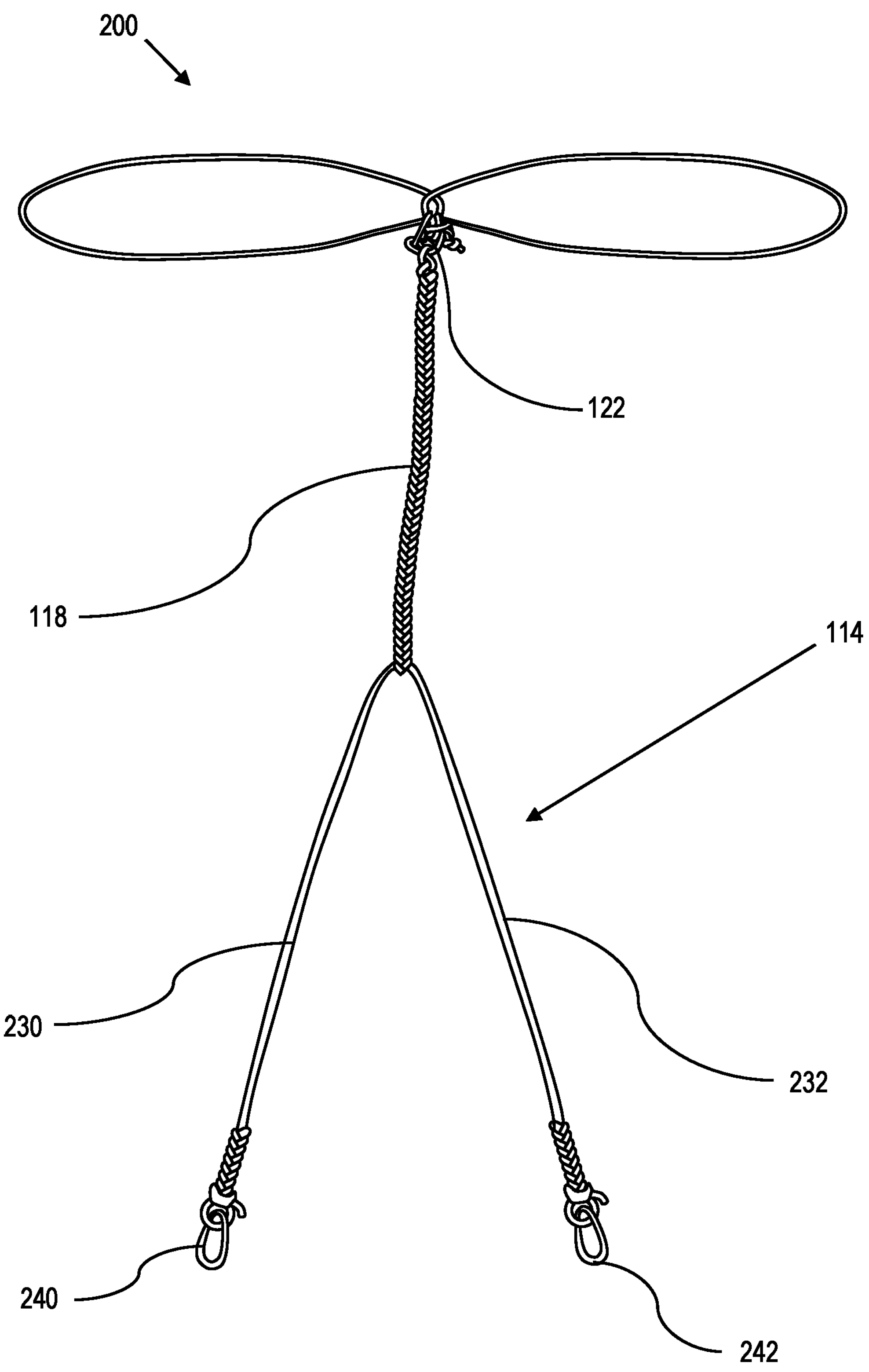
FIG. 3 is a drawing of a second embodiment of the harness with a double-ended braided lead for pulling a sled, according to various aspects of the present disclosure.

Turning now to FIG. 3, a second embodiment of the harness 200 is shown. The second embodiment 200 is similar to the first embodiment 100 (FIG. 1) except the single-bowline loop 114 is larger in the second embodiment 200. For example, the single-bowline loop 114 of the second embodiment 200 may be eight feet (2.4 meters) long. In the second embodiment 200, the single-bowline loop 114 is cut, creating a first line 230 and a second line 232. In some embodiments, each line 230, 232 is coupled to a removable fastener 240, 242, respectively, via inverted single-bowline knots to couple to the load. In other embodiments, the removable fasteners 240, 242 are not required, as the lines can couple directly to the load.

The embodiments of the harness 100, 200 discussed above in FIGS. 1-3, as well as other embodiments, may be coupled to a load (e.g., an ice-fishing sled). A user can put their arms through the limb loops of the harness to wear the harness like a backpack. The user can then pull the load more easily by utilizing their full body weight with no hands required. Further, in case of emergency (e.g., someone falling through ice of an ice-fishing spot into icy water—i.e., a victim), the user can quickly remove the removable fastener 122 that hooks from the final daisy-chain knot loop to the limb loops 104, 106 of the harness knot 102. The braided lead 118 can then be unraveled to its full length (instead of the condensed length) in a few seconds. The user can then throw the unraveled lead and limb loops of the harness to a victim from a safe location up to approximately forty feet away (based on a fifty foot rope) to assist the victim out of the icy water. Other lengths of rope allow the user to be different distances away based on the rope length. Therefore, the user can stay at a safer distance to rescue the victim rather than getting too close to where the victim fell through the ice, which could result in the user falling through the ice as well. Thus, the harness with a braided lead functions as a pulling device and a safety rope. Further, except for the attachment devices, the entire harness (loops and lead) can be made from a single, integral piece of rope, which allows the harness to be unraveled to a longer distance without a need to splice together ends of separate ropes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A harness comprising:

two limb loops created from a harness knot coupled to a lead via the limb loops of the harness knot at a first end of the lead, wherein the lead is a braided lead;

a single-bowline knot creating a single-bowline loop at a second end of the lead; and a first removable fastener that prevents the braided lead from unbraiding is directly and removably attached to the lead in a final loop of the braided lead; and at least one of said first removable fastener and a second removable fastener is directly and removably attached to the limb loops of the harness knot;

wherein the limb loops, lead, and single-bowline loop are made from an integral piece of rope.

2. The harness of claim 1, wherein the single-bowline loop is segmented to define a first line and a second line for attachment to a load.

3. The harness of claim 2, wherein:

the first line includes a first coupling device for attachment to the load; and the second line includes a second coupling device for attachment to the load.

4. The harness of claim 3, wherein:

the first coupling device of the first line is a carabiner; and the second coupling device of the second line is a carabiner.

5. The harness of claim 1 further including a carabiner coupled to the single-bowline loop for coupling to a load.

6. The harness of claim 1, wherein the first removable fastener is a carabiner.

7. The harness of claim 1, wherein the harness knot is a parallel-bowline knot.

8. The harness of claim 1, wherein the harness knot is a Spanish-bowline knot.

9. The harness of claim 1, wherein the harness knot is a double-bowline knot.

10. The harness of claim 1, wherein the harness knot includes a tag loop that wraps around the limb loops.

* * * * *